United States Patent [19]

Braun et al.

[11] Patent Number: 4,998,778
[45] Date of Patent: Mar. 12, 1991

[54] MINING TOOL INCLUDING A CHISEL AND A CHISEL HOLDER

[75] Inventors: Gert Braun; Ernst Braun, both of Essen-Heisington, Fed. Rep. of Germany

[73] Assignee: Halbach & Braun Industrieanlagen, Wuppertal, Fed. Rep. of Germany

[21] Appl. No.: 444,018

[22] Filed: Nov. 30, 1989

[30] Foreign Application Priority Data

Jan. 4, 1989 [DE] Fed. Rep. of Germany ....... 3900140

[51] Int. Cl.$^5$ ..................... E21C 25/48; E21C 27/44
[52] U.S. Cl. ......................................... 299/91; 299/93; 411/55
[58] Field of Search ..................... 299/34, 79, 91, 93; 37/142 R; 411/14, 44, 55; 403/334

[56] References Cited

U.S. PATENT DOCUMENTS

| | | | |
|---|---|---|---|
| 3,904,247 | 9/1975 | Ostrop | 299/91 |
| 4,564,324 | 1/1986 | Leibhard | 411/55 X |
| 4,872,274 | 10/1989 | Giersch et al. | 403/334 X |

FOREIGN PATENT DOCUMENTS 3122868 12/1982 Fed. Rep. of Germany ........ 299/79

Primary Examiner—Ramon S. Britts
Assistant Examiner—David J. Bagnell
Attorney, Agent, or Firm—Toren, McGeady & Associates

[57] ABSTRACT

A mining tool for the breaking-down of minerals, particularly coal. The mining tool includes a chisel with a chisel shaft with a receiving bore and a chisel holder with an insertion bore. The bores are in alignment when a locking bolt is driven into the bores. The locking bolt is a mandrel screw with a threaded portion which over its length includes a sharp thread and a trapezoidal thread. The circumferential surfaces of the trapezoidal thread form a driving-in cone. The mandrel screw can be easily driven into the receiving bore which includes a chuck. In addition, because of the sharp thread, the mandrel screw can be unscrewed quickly, so that a quick chisel exchange is possible.

6 Claims, 1 Drawing Sheet

MINING TOOL INCLUDING A CHISEL AND A CHISEL HOLDER

BACKGROUND OF THE INVENTION

1. Field of the Invention

The present invention relates to a mining tool for the breaking-down of minerals, particularly coal. The mining tool includes a chisel with a chisel shaft and a chisel holder with a shaft receiving means adjusted in shape to the chisel shaft. The chisel holder has an insertion bore and the chisel shaft has a receiving bore with a chuck for a locking or securing bolt. The insertion bore and the receiving bore extend essentially transversely of the chisel holder and the chisel shaft and are in alignment when the locking bolt is driven into the bores.

2. Description of the Related Art

In a known mining tool, the chisel shaft is fastened in the chisel holder by means of a securing wedge which is rectangular in cross-section. The chisel holder and the chisel shaft each have corresponding rectangular receiving means for driving in the securing wedge. The receiving means in the chisel holder additionally includes a jaw-like chuck. The securing wedge has sawtooth-like wedge surfaces which dig into the chuck in a manner of barbs in order to ensure a good fastening of the chisel shaft in the chisel holder.

In the above-described known mining tool, loosening of the fastening of the chisel is extremely problematic when the chisel must be replaced after it is worn or damaged or must be removed from the chisel holder for repair purposes. For removing the chisel, the rectangular securing wedge must be driven out of the receiving means together with the chuck against the clamping action created by the barb-like wedge surfaces when the wedge is driven in. The procedure is very complicated and time-consuming.

It is, therefore, the primary object of the present invention to provide a mining tool for the breaking-down of minerals, particularly of coal, of the above-described type in which the chisel cannot only be easily and quickly fastened in the chisel holder, but can also be easily and quickly separated, so that a quick exchange of chisels is possible.

SUMMARY OF THE INVENTION

In accordance with the present invention, in a mining tool of the above-described type, the locking bolt is constructed as a mandrel screw with a shaft whose threaded portion has a thread which over its length is divided into a sharp thread and a trapezoidal thread. The trapezoidal thread ends at the bottom end of the threaded portion. The circumferential surfaces of the trapezoidal thread which are arranged successively in axial direction of the screw or the envelope of the circumferential surfaces form a driving-in cone.

The invention is based on the recognition that a mandrel screw for securing a chisel shaft in a chisel holder can be easily and quickly driven into the receiving bore if the threaded portion of the screw is at least partially constructed as a cone which penetrates the chuck. The conical shape of the circumferential surfaces of the trapezoidal thread or of the windings of the thread make this possible. On the other hand, the chisel or the chisel shaft can also be simply and quickly removed because, due to the sharp thread which has also penetrated into the chuck, the mandrel screw according to the invention can be easily turned out of the chuck and out of the receiving bore. Of course, for driving in and turning out the mandrel screw, the screw has a conventional screw head, for example, a hexagonal head.

The removal of the mandrel screw by turning it out of the chuck and out of the receiving bore is further facilitated by the fact that this chuck practically forms a threaded sleeve for the two thread portions, i.e. for the trapezoidal thread as well as for the sharp thread. This is because such a threaded sleeve is inevitably formed by the dirt which accumulates when the mining tool according to the present invention is used in underground mining operations. In fact, the dirt between the threads of the mandrel screw and the chuck itself forms threads because the dirt cakes together and becomes integrally connected with the chuck. Moreover, the sharp thread engages the chuck in such a way that the mandrel screw can be quickly and easily removed from the receiving bore of the chisel shaft and, of course, from the insertion bore of the chisel holder, when the chisel is to be replaced or removed. As a result, the time required for exchanging chisels is substantially reduced.

In accordance with another significant feature of the present invention, the trapezoidal thread extends over at least half the length of the thread, especially since only a few pitches of the sharp thread must be in engagement to be able to unscrew the mandrel screw from the receiving bore. In order to facilitate the insertion and also the driving-in of the mandrel screw into the chuck of the receiving bore, the threaded portion may have a conical bottom end.

In accordance with another feature of the invention of independent significance, the shaft of the mandrel screw has a portion which is free of thread and includes a centering cone in the transition area to the threaded portion. The outer diameter of the shaft portion without thread penetrates with a precise fit in the receiving bore of the chisel shaft. Thus, the mandrel screw centers the chisel shaft in the chisel holder. In addition, a tight seat of the mandrel screw without play in the chisel holder or the receiving bore is ensured.

The invention further provides that the mandrel screw has an intended breaking point at the transition between the shaft portion without thread and the threaded portion. Thus, if it is unexpectedly not possible to remove the screw by turning it because the screw is stuck or jammed in the receiving bore, for example, due to corrosion, it is then still possible to separate the fastening of the chisel because the screw head with the shaft portion without thread can be easily separated from the threaded portion at the intended breaking point. The chisel shaft can then be pulled out of the chisel holder and the threaded portion which has remained in the receiving bore can be driven out.

Finally, the present invention recommends that the chuck is a replaceable hose-type chuck with notch impact strength and that the chuck has an inner diameter which is selected to be smaller by a predetermined extent than the outer diameter of the threaded portion. It is recommended that the chuck is replaced when the chisel is exchanged in order to ensure an always perfect seat of the locking bolt or the mandrel screw when a new chisel is mounted. The hose-type chuck with notch impact strength may be of an appropriate metal or of an appropriate plastics material.

The various features of novelty which characterize the invention are pointed out with particularity in the claims annexed to and forming a part of this disclosure.

For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 1 is a partially sectional view of a mining tool according to the present invention with a mandrel screw which is not fully driven in.

DESCRIPTION OF THE PREFERRED EMBODIMENT

Figure 1:
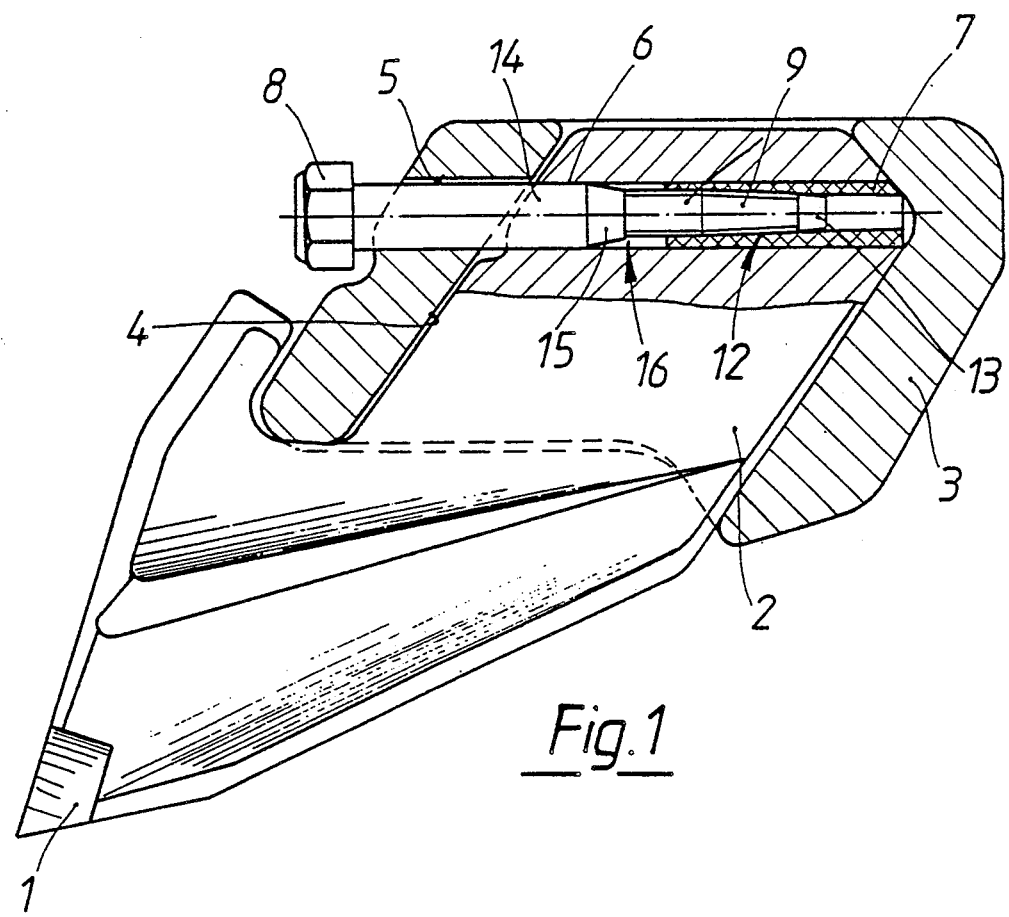

As illustrated in FIG. 1 of the drawing, a mining tool for the breaking-down of minerals, particularly coal, generally includes a chisel 1 with a non-circular chisel shaft 2 and a chisel holder 3 which has a shaft receiving means 4 which in its shape is adjusted to the chisel shaft 2. The chisel holder 3 has an insertion bore 5 and the chisel shaft 2 has a receiving bore 6 with a chuck 7 for a locking bolt 8. The bores 5, 6 extend essentially transversely of the chisel holder 3 and the chisel shaft 2 and, when the locking bolt 8 is driven in, the chisel holder 3 and the chisel shaft 2 are in alignment. Thus, the chisel shaft 2 is fastened in the chisel holder 3 so as to be secured against rotation.

Figure 2:
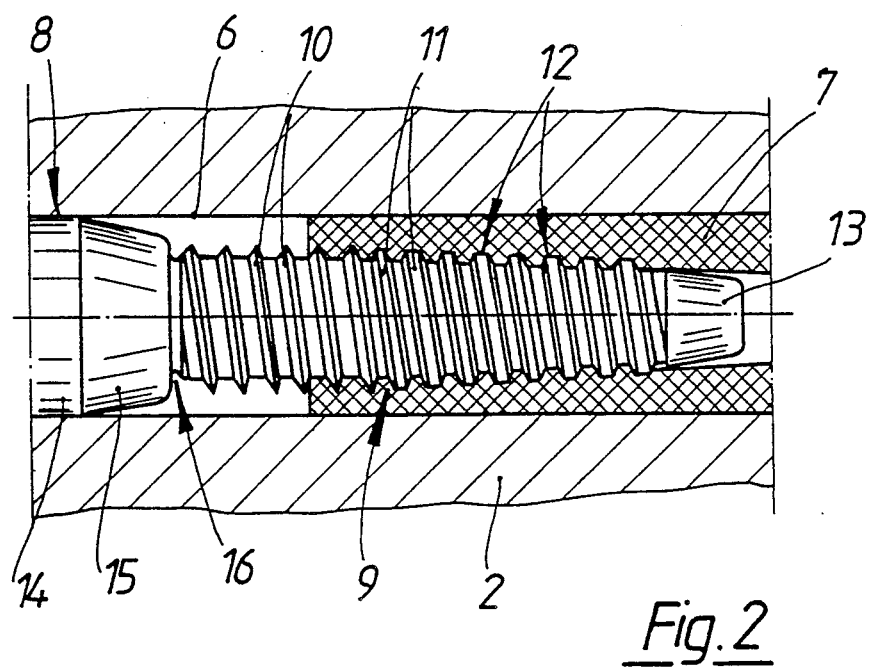
FIG. 2 is a sectional view, on a larger scale, of a detail of the mining tool shown in FIG. 1.

As shown in FIG. 2 of the drawing, the locking bolt is constructed as a mandrel screw 8 whose screw shaft 9 has a threaded portion, wherein the thread is over its length divided into a sharp thread 10 and a trapezoidal thread 11. The trapezoidal thread 11 ends at the bottom end of the screw shaft 9. The circumferential surfaces 12 of the trapezoidal thread which follow each other in axial direction of the screw or the envelope of the trapezoidal thread forms a driving-in cone, so that an excellent fastening of the chisel is ensured when the mandrel screw 8 is driven in. On the other hand, the sharp thread 10 makes it possible to quickly unscrew the mandrel screw 8 and, thus, to separate the chisel 1 for repair work or when a chisel exchange is required. The trapezoidal thread 11 extends over at least half of the threaded portion. The screw shaft 9 has a conical bottom end 13. The screw shaft 9 further includes a shaft portion 14 without thread and with a centering cone 15 at the transition t the threaded portion.

When the mandrel screw 8 is driven in, the outer diameter of the shaft portion 14 without thread penetrates with a precise fit into the receiving bore 6 of the chisel shaft 2. As a result, a centering effect and a support which is free of play is ensured for the chisel shaft 2. The screw shaft 9 has an intended breaking point 16 at the transition between the shaft portion 14 without thread and the threaded portion. The chuck 7 is a replaceable hose-type chuck with notch impact strength. The inner diameter of the hose-type chuck is selected to be smaller by a predetermined extent than the outer diameter of the threaded portion.

While a specific embodiment of the invention has been shown and described in detail to illustrate the application of the inventive principles, it will be understood that the invention may be embodied otherwise without departing from such principles.

We claim:

1. In a mining tool for the breaking-down of minerals, particularly coal, the mining tool including a chisel with a chisel shaft and a chisel holder with a shaft receiving means adjusted in shape to the chisel shaft, the chisel holder having an insertion bore and the chisel shaft having a receiving bore, a chuck for a locking bolt mounted in the receiving bore, the insertion bore and the receiving bore extending essentially transversely of the chisel holder an the chisel shaft and being in alignment when the locking bolt is driven into the bore, the improvement comprising the locking bolt comprising a mandrel screw having a shaft and a bottom end, the shaft having a threaded portion with a thread which over its length includes a sharp thread and a trapezoidal thread, the trapezoidal thread ending at the bottom end of the threaded portion, the trapezoidal thread having circumferential surfaces arranged successively in axial direction of the screw, the circumferential surfaces defining a driving-in cone.

2. The mining tool according to claim 1, wherein the trapezoidal thread extends over at least half the length of the thread.

3. The mining tool according to claim 1, wherein the bottom end of the shaft is cone-shaped.

4. The mining tool according to claim 1, wherein the shaft of the mandrel screw has a portion which is free of thread, the thread-free portion including a centering cone, the centering cone being provided at a transition between the thread-free portion and the threaded portion, the thread-free portion having an outer circumferential surface, the receiving bore of the chisel shaft receiving with a precise fit the outer circumferential surface of the thread-free portion.

5. The mining tool according to claim 4, wherein the mandrel screw shaft comprises an intended breaking point at the transition between the thread-free shaft portion and the threaded portion.

6. The mining tool according to claim 1, wherein the chuck is a replaceable hose-type chuck, and wherein the chuck has an inner diameter which is smaller by a predetermined extent than the outer diameter of the threaded portion.

* * * * *

UNITED STATES PATENT AND TRADEMARK OFFICE
CERTIFICATE OF CORRECTION

PATENT NO. : 4,998,778
DATED : March 12, 1991
INVENTOR(S) : Gert Braun et al

It is certified that error appears in the above-identified patent and that said Letters Patent is hereby corrected as shown below:

On the title page, item [75] should read as follows:
--[75] Gert Braun; Ernst Braun, both of
Essen-Heisingen, Federal Republic--.
of Germany Signed and Sealed this Sixth Day of October, 1992

Attest:

DOUGLAS B. COMER

*Attesting Officer*　　　*Acting Commissioner of Patents and Trademarks*